Figure 1:
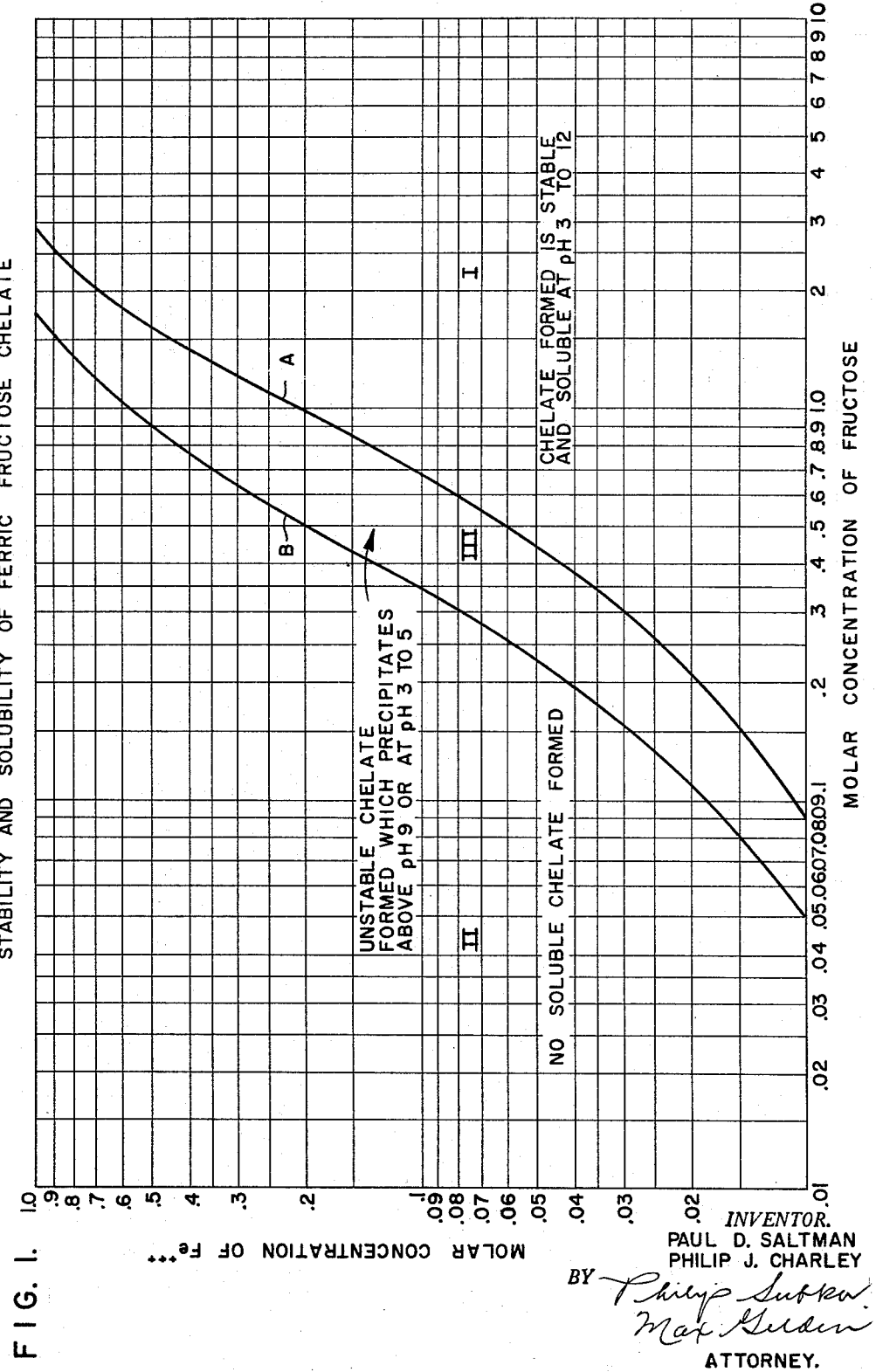

INVENTOR.
PAUL D. SALTMAN
PHILIP J. CHARLEY
ATTORNEY.

3,275,514
PROCESS FOR INTRODUCTION OF METALS INTO THE MAMMALIAN SYSTEM
Paul D. Saltman, 416 S. Michigan Ave., Pasadena, Calif., and Philip J. Charley, 1365 Ardenes Drive, Glendale, Calif.
Filed Apr. 12, 1960, Ser. No. 21,684
6 Claims. (Cl. 167—68)

This invention relates to a process for introducing a complex of a metal and a reducing sugar into the mammalian body, and which is stable at the pH where it is encountered in the body, is nontoxic and is tolerable to the body, and is generally dialyzable through semi-permeable membranes such as a dialysis bag. The invention is particularly concerned with a process which makes use of the superior properties of such metal-sugar complexes for transport of metals through biological membranes, which complexes, especially those containing iron or calcium, are particularly valuable for therapeutic treatment.

It is well known that a number of polyvalent metallic ions such as iron will form complexes with polyhydroxy compounds such as polyhydric alcohols. However, on any substantial change in pH, the shift in equilibrium may cause the complex to decompose and the metallic ion in the presence of hydroxyl ion may tend to form a precipitate. This materially reduces the usefulness of these complexes for holding metallic ions in solution over varying pH ranges, and accordingly limits the usefulness of such complexes for trace metal metabolism in the body of mammals, including the human body.

The term trace metal metabolism is meant to connote the introduction in the mammalian system of those metal ions essential in small quantities for biological processes, and the manner in which such metals react in the body to form certain compounds. Bulk metals such as calcium and magnesium, which are nontoxic can be introduced in larger quantities.

With respect to therapeutic metallic complexes, for example, iron choline citrate and ferrous fumarate employed for iron metabolism in the human body, the rate of absorption of the iron through the membrane forming the intestinal wall and into the blood, in many cases is of relatively low order. While we are not certain of the reasons for this, it is believed that such prior art iron compositions and complexes employed for this purpose have insufficient solubility and stability under the varying pH conditions encountered in the stomach and in the intestine. On passage from the low acidity enviroment encountered in the stomach, e.g. of the order of pH of about 1 to 3, to the alkaline enviroment of about 7 to 8 in the intestine, the iron tends either to precipitate as a hydroxide or to exist in a form which is poorly absorbed through the intestinal wall.

One object of the invention is to afford procedure for introducing certain metals into the animal and human body.

Another object of the invention is to afford a vehicle and procedure for absorption of certain metals through biological membranes, for physiological and therapeutic use. The term "biological membrane" refers to the permeability barrier existing between the external and the internal environment of a body cell. Examples of such biological membranes are the intestinal mucosa of a rabbit, the external membrane of a liver cell, or the membrane of a red blood cell.

Another object of this invention is to provide procedure for the introduction of certain metals into the blood of mammals, employing as a vehicle a class of metallic complexes or chelates of metals which are nontoxic in the amounts employed, are stable and soluble, preferably over a wide pH range, and which have the important property of being readily absorbed through biological membranes.

Yet another object is to provide procedure for the rapid absorption of trace metals such as iron through the intestinal walls of mammals, particularly the human body, and into the blood.

Yet another object is the introduction of relatively large amounts of bulk metals such as the alkaline earths directly into the blood stream of mammals, employing a nontoxic vehicle for this purpose.

A still further object is to provide a process for introducing metals into the blood of mammals, particularly the human body, employing a vehicle or complex of such metallic constituent which can be introduced into the body either orally, intravenously or intramuscularly.

A still further object is the provision of processes of the aforementioned type employing soluble, stable and nontoxic chelates of certain metals with reducing sugars, whose stability and solubility are maintained at the varying pH conditions encountered in the stomach and intestine of mammals, particularly the human body.

A particular object is the provision of processes of the aforementioned type employing metallic complexes of certain metals with a specific class of sugars, to provide chelates of high stability and solubility over practically the entire biological pH range, and which are especially adapted for obtaining a high rate of absorption of the metallic constituent through biological membranes of the body and into the blood.

We have found that compositions composed of a metallic complex of a ligand and a biologically tolerable metal of the group consisting of the alkaline earth metals calcium, magnesium, strontium and barium, and elements 22 through 30 inclusive of the Periodic Table, where the ligand is a reducing sugar, which complex is nontoxic and may be soluble over a pH range of about 3 to 12, function as superior vehicles for the introduction of the metallic constituent into the organism. One of the important characteristics of these metal complexes is that they are readily absorbed through biological membranes of mammals, especially those of the human body, and into the blood. Of particular significance we have found that this discovery provides an outstanding procedure for rapid absorption of such metals, particularly iron and calcium, through the intestinal walls of the animal or human body and into the blood, with no toxic effects. The complex functions as a vehicle to maintain the metallic constituent in a soluble and accessible form for passage through the biological membrane, such as the intestinal wall, to thus furnish to the blood or cells the required metallic constituent. For this purpose, the metal complexes employed in the invention can be introduced into the body orally.

Alternatively, such complexes may be employed as a vehicle for introduction of the metallic constituent into the blood by intravenous or intramuscular administration of the complex, as explained more fully hereinafter.

The complexes employed in the invention process are believed to be in the form of chelates of a metal of the group consisting of the alkaline earth elements calcium, magnesium, strontium and barium, and elements 22 to 30, namely, titanium, vanadium, chromium, manganese, iron, cobalt, nickel, copper and zinc, with the reducing sugar. The complex composition has an average molecular ratio of the sugar to the metallic constituent, e.g. iron, of at least 2:1. Such complex compositions may include a minor portion of chelate having a molecular ratio of the sugar to the metal which is less than 2:1. However, the presence of any material proportion of chelate wherein such ratio is less than 2:1 is not desirable because such chelate is not readily dialyzable. The complex composition is free of any physiologically deleterious materials.

The complex or chelates employed in the invention process can be obtained in the form of an alkali metal salt, e.g. sodium or potassium, or ammonium salt, depending on the particular alkali employed as an alkalizing medium during formation of the chelate. The preferred form of the chelates employed in the invention are those which are soluble and stable over the wide range of pH of about 3 to 12, so that precipitation is minimized and preferably prevented over the variations in pH encountered in the mammalian body, resulting in efficient and rapid absorption of the metallic constituent of such complexes through the physiological membranes and into the blood. However, under some physiological conditions encountered during application of the complexes or chelates for therapeutic use, according to the invention, complexes or chelates which may tend to precipitate in a pH range of about 5 to about 9, but which can be redissolved at lower or higher pH, may also be utilized.

It has been found that to obtain formation of the complexes or chelates hereof, aqueous solutions of the reducing sugar and of a soluble metallic salt are employed, including a substantial molar excess of the sugar to the metallic constituent of said salt. Thus, the aqueous solution of the complex produced in the reaction generally contains a substantial molar excess of the sugar to the metallic constituent of the complex, as described more fully below. This aqueous solution of the complex can be employed in the invention procedure for introducing the metallic constituent into the blood. Such aqueous solution can be dried to obtain a solid composition comprising an alkali metal or ammonium salt of the complex having substantially the same molar ratio of reducing sugar to metal as present in the aqueous solution. Where the aqueous solution of the chelate is at its isoelectric pH, evaporation of the liquid will produce a solid composition comprising the chelate, with no alkali metal or ammonium radical attached. Alternatively, the aqueous solution of the complex can be treated with precipitating agents such as alcohol, to precipitate the complex forming the solid alkali metal or ammonium salt of the complex. These solid compositions can also be used in the invention process as vehicle for introducing the metallic constituent into the blood. As will be noted below, such precipitate may contain a smaller molar proportion of reducing sugar to the metallic constituent, than the molar ratios of such sugar to the metal present in the aqueous solution of the complex.

For producing the complexes or chelates of the invention, a soluble compound or compounds of any one or more of the metals calcium, magnesium, strontium, barium, titanium, vanadium, chromium, manganese, iron, cobalt, nickel, copper or zinc, is reacted in aqueous solution with a reducing sugar of the type described more fully below, the reaction taking place at about room temperature. For this purpose an aqueous solution of such soluble metal-containing compound can be mixed with an aqueous solution of the reducing sugar, or one or both of such reactants in solid form can be added to water to form an aqueous solution of the reactants. The metallic ions can be supplied from any soluble compound thereof, e.g., the chlorides, nitrates, sulfates and acetates.

The sugars employed to form the chelates of the invention are of the class which are known as "reducing sugars." Preferably the mono and disaccharides are used. These include the trioses, tetroses, pentoses and hexoses. Among the monosaccharides, the hexoses, namely fructose, glucose, galactose and mannose have been found to produce best results, that is, chelates of greatest solubility and stability. Invert sugar, composed of a mixture of fructose and glucose, can also be employed. Fructose or glucose can be employed in their dextro or laevo rotatory forms, or as mixtures thereof. Fructose has been found most desirable. The pentoses, such as ribose, ribulose, xylose and arabinose, can also be employed, and also the tetroses, such as erythrose, and the trioses such as dihydroxy acetone, but these materials are not preferred, because the chelates produced therefrom are less stable and require greater molecular ratios of the sugar to metallic ion. Among the disaccharides we can, for example, employ the dihexoses such as lactose and maltose, and cellobiose. Mixtures of one or more of any of the above sugars can be utilized also. Sugars which are not of the reducing type, such as sucrose, are not suitable. However, the term "reducing sugars" employed herein is not employed to connote any known function of the sugar in forming the chelates of the invention, but is used essentially to define the class of materials which we have found suitable for forming the chelates employed in the invention process.

We have found that in producing the soluble and stable chelates of the invention, the aqueous solution of the metallic ion can be employed conveniently in a range of concentration such that the final solution of the complex is about .01 to 1 molar in the metal (that is, .01 to 1 gram atom of the metal per liter of solution), usually about 0.1 to 1 molar. The molar excess of the sugar employed with relation to the molar concentration of the metal in the final solution is preferably at least 2:1 and most desirably at least 4:1. Such molar ratio can be as high as 32:1, or higher. It is believed that the that the reason for this large molar excess of the reducing sugar over the metallic ion is the competition between (1) the OH ion for producing hydroxides with the metallic ion under aqueous alkaline conditions on the one hand, and (2) the sugar for producing complex chelates with the metallic ion under the same aqueous alkaline conditions on the other hand. We have found that to overcome the tendency of the metallic ions to form hydroxides, and to produce instead the chelates of the invention, the above noted large molar excess of sugar to metallic constituent must be employed. However, the invention is not to be taken as limited by the theory of the function of the reactants described above.

The higher the molar concentration of the metallic ion employed in producing the complex, the lower is the ratio of molar concentration of sugar to metallic ion employed; and the lower the molar concentration of the metallic ion employed in the aqueous solution thereof, the higher is the ratio of molar concentration of sugar to metallic ion required. For example, ferric ion may be employed as an aqueous solution of ferric chloride and the iron concentration can range from .01 to 1 molar in the final solution. The molar concentration of reducing sugar, e.g. fructose, employed for admixture with the ferric chloride can range from a 2:1, and preferably 4:1 molar concentration of fructose to iron, to 9:1 or higher. At least about a 2:1 molar excess of fructose is employed where a 1 molar solution in iron is used, and at least a 9:1 molar excess of fructose is employed at the lower end of the range of concentration of the iron in solution, e.g. when using a .01 molar ferric chloride solution. Hence, when the absolute concentration of the metallic constituent is low, a larger excess of the reducing sugar to the metallic constituent is employed, and vice versa.

The same general principles with respect to concentration of the reducing sugar and metallic ion for forming the complexes apply to the other metallic ions and the other reducing sugars which may be employed in producing the complex as employed in the invention process.

In the case of ferrous and cuprous elements, however, it has been found that for corresponding molar concentrations of metallic consituent, that is, ferrous or cuprous, a greater molar excess of sugar is employed than in the case of ferric or cupric. Thus, for a final solution 1 molar in ferrous or cuprous, the concentration of the reducing sugar should be in molar excess of 6:1 over ferrous or cuprous constituent, and at a molar concentration of 0.01 in ferrous or cuprous ion, a 32:1 molar ratio of sugar to such metal should be used. Ferrous and cuprous ions do not chelate as readily as ferric and cupric ions; that is, it requires a higher ratio of the concentration of sugar to ferrous or cuprous ion as compared to ferric or cupric.

With respect to manganese and cobalt, preferred chelates are produced employing these metals as the $Mn^{++}$ and $Co^{+++}$ ions, respectively.

That the solubility and stability of the chelates employed in the invention process are both a function of absolute concentration of the metallic constituent, e.g. iron, and the ratio of the molar concentration of the sugar to the metallic constituent, is indicated by the plot shown in FIG. 1 of the drawing. This is a plot of the molarity of fructose against the molarity of ferric ion employed for preparing the ferric fructose chelate. It will be noted that for any given concentration of ferric ion, concentrations of fructose to the right of curve A will generally produce a chelate which is soluble and stable throughout a pH range of 3 to 12. That is, a chelate which is soluble and stable over the above pH range is formed when the values of the molar concentration of ferric ion and fructose employed in preparing the chelate are in the region or area designated I in FIG. 1. This pH range of about 3 to 12 is the overall operable pH range for the complexes or chelates employed in the invention process. At a pH of about 2 or below, the chelate formed in Region I of FIG. 1 dissociates into the sugar and metallic ion, but reforms at pH above 2, due to the large excess of sugar present. However, the pH of the environment in which the physiological process of introduction, absorption or transport of the metallic constituent takes place in the body is generally at least 3 or higher, so that in the environmental locations of the body where the chelate is functioning as a vehicle for introduction of the metallic constituent into the body tissues for utilization of such metal, e.g. by absorption, the chelate is in its associated functional form, according to the invention. Thus, for example, where the chelate is taken orally and passes first into the stomach, the stomach may be at pH of about 1, causing dissociation of the chelate. But absorption does not take place in this region to any appreciable extent. However, on passage of this dissociated composition into the intestine, where pH may be of the order of about 6 to 8, the chelate reforms due to the large excess of sugar present, and in this pH environment, where absorption of the metal through the intestinal wall takes place, the chelate is in its soluble, operable form. The above is our understanding of the mechanism of the transformation of the chelate at varying pH conditions in the body, and the invention is not to be taken as limited by the above description of such mechanism.

Referring again to FIG. 1, for a .01 molar solution of ferric ion, the use of a concentration of .09 molar or more in fructose produces a chelate generally soluble under all operable pH conditions, representing a molar excess of fructose over ferric ion of at least 9:1. For a 0.1 molar solution of ferric ion, the use of a concentration of 0.7 molar solution or greater of fructose produces a soluble and stable chelate, representing a molar ratio of fructose to iron of 7:1; and for a 1.0 molar ferric ion solution, soluble and stable chelates are produced employing a concentration of about 3 molar or more in fructose, representing a fructose to ferric ion molar ratio of 3:1. However, in each of these instances, the use of a larger molar ratio of fructose to ferric ion is preferred over those minimum ratios above specified, in order to insure solubility of the chelate over the entire pH range of 3 to 12. For example, where the molar concentration of ferric ion is .01, a .16 molar concentration of fructose is preferably employed, representing a molar ratio of 16:1 of fructose to ferric ion, and for a 1 molar concentration of ferric ion, a 4 molar fructose solution is preferred.

Where, for a given concentration of ferric ion employed in producing the chelate, the concentration of the fructose is in Region II to the left of curve B, no soluble chelate can be formed regardless of the pH. Where the concentration of fructose is in Region III between curves A and B, the chelate is soluble at pH of about 3 to about 5, and at a high pH above 9; that is, a major proportion, e.g. 80–90%, of the chelate formed precipitates between pH 5 and 9, but redissolves at low pH between 3 and 5, or at high pH above 9. Thus, for a 0.1 molar concentration of ferric ion, the use of a solution of fructose of a molarity greater than .35 and less than 0.7 produces a chelate of the latter type. Such a chelate can be used under conditions where the particular environment of the mammalian body in which the chelate is to be operative has a pH such that the chelate is soluble under such pH conditions.

In preferred practice for preparing the chelates employed in the invention process, after the soluble metal compound has been reacted in aqueous solution with the reducing sugar in the required molar concentrations, the solution is adjusted to a biologically compatible pH of about 8 by adding an alkaline material such as sodium or potassium hydroxide, or ammonium hydroxide. This is the approximate pH which is required for intravenous or intramusclar injection of the chelates hereof. Where the complex or chelate is to be taken orally, this adjustment to pH 8 has the particular advantage of improving the palatability of the formulation. However, the chelate can be administered orally at pH other than 8, e.g. below 7, such as pH 4 or 5.

The chelates of the invention are slightly charged, but have an isoelectric pH, that is, a pH at which they are essentially uncharged. While the chelates of the invention need not be at their isoelectric pH in order to obtain superior therapeutic results, e.g. superior metal absorption characteristics, according to the invention, it is preferred, although not necessary, to add a buffer to the chelate, so as to establish the isoelectric pH in the environment, for example the intestine, to facilitate a more rapid absorption of the metallic constituent of the chelate. This action will continue for the period of the buffering action. It will be understood, of course, that a major feature of the invention where the feeding is oral, is that the chelate remains stable and soluble without precipitation, when it passes from the stomach where the pH is of the order of about 1 to 2, to the intestine where the pH is about 7 to 8, as previously noted. However, in the case of the ferric fructose chelate, which has an isoelectric pH of about 4.6 or 4.7, by maintaining the chelate environment at pH 4.6 to 4.7, absorption of the iron through the intestinal wall and into the blood takes place more rapidly than at a different pH, where the chelate is no longer at its isoelectric form. Such buffering agents may be a mixture of sodium acetate and acetic acid, which is added to the chelate. Where, for other purposes, it is desired to maintain the chelate environment at a more alkaline pH, sodium bicarbonate can be employed as a buffer. Thus, where the chelate solution is to be administered intravenously or intramuscularly, the pH of the chelate may be adjusted by buffers to about 7 to 8 pH.

We have further found that the chelates employed in the invention process can be precipitated from aqeous solution, e.g., with alcohol, and the resulting water-soluble, isolated chelate will have a molar proportion of reducing sugar to metal different from the molar ratio of sugar to metallic constituent in the aqueous solution. We have found, for example in the case of ferric iron chelates, that by precipitation of the chelate in alcohol, the stable, water-soluble, isolated chelates of fructose and ferric iron may have a composition of about two molecules of fructose to one molecule of ferric iron, together with water of hydration. Where an alkaline material was employed in adjusting the pH of the aqueous solution of the chelate, as previously described, the solid, isolated chelate will also contain sodium, potassium or the ammonium radical. While other ratios of sugar to iron can be obtained, in all instances the molecular ratio of sugar to iron in the chelate is at least 2:1. Thus, for example, the composition of the chelate can be 4 molecules of fructose to 1 molecule of ferric iron. The actual composition of the alcohol insoluble material is independent of the concentration of the sugar, but is a function of the rate at which alkali, e.g. sodium hydroxide or other alkaline material, is added to alkalize the aqueous chelate solution.

It will be noted that the molar ratio of sugar to metallic constituent, e.g. iron, in these precipitated chelates is substantially lower than the molar ratio of sugar to iron in the corresponding aqueous solution from which the chelate is isolated.

The chelates employed in the invention process can be administered orally, intravenously or intramuscularly in the form of an aqueous solution of the chelate, the molar concentration of metallic ion being in the range of .01 to .5, with the sugar present in the above described molar excess over metallic ion. For example, in the case of a ferric fructose chelate, where the concentration of iron is .01 to 0.5 molar, the molar concentration of fructose can range from about .16 to 2.0. In the case of the chelates of ferric iron and glucose, the molar concentration of ferric iron usually is also about .01 to 0.5, and the molar concentration of glucose can range from about .32 to 2.5. Buffering agents as noted above, e.g. sodium acetate-acetic acid, may be present in the aqueous solution of the chelate, but are not involved in complex formation.

The invention chelates can also be taken orally in the form of a pill or tablet. Such pill can be prepared by removal of water from the aqueous solution of the chelate without adversely affecting the chelate, e.g. by flash distillation, or by precipitating the chelate from solution by means of ethanol. The solid isolated chelate is dried, and excess sugar can be added, if desired. Preferably, sodium acetate is also added to the pill composition for buffering purposes.

In practice of the invention process other alternative methods of feeding the complex orally can be used. For example, the reducing sugar, e.g. in the form of an aqueous solution can be taken, followed within a relatively short period by an aqueous solution of a soluble salt of the metal, e.g. ferrous sulfate or ferric chloride. Or, the reducing sugar and metal salt can be mixed in the form of a dry mixture in the proper molar proportions as described above, and the mixture taken orally and dissolved in the stomach. Further, a chelate of the reducing sugar and the metal can be formed without the required molar excess of the sugar as described above, and the dry chelate, together with excess sugar admixed therewith can be taken orally to produce a solution within the body having the required molar excess of sugar to metallic ion.

Hence any suitable technique can be employed for feeding the complex orally, so long as the operative chelates employed in the invention process are formed within the environment of the body where the chelate is intended to function to furnish the metallic constituent thereof to the desired organism.

In utilizing the metal chelates, e.g. the iron chelates according to the invention process, where the complex is fed orally, it passes to the intestine of the body, as described above, for absorption through the intestinal wall. Thus, for example, where an iron-sugar chelate is employed according to the inventon, the iron which passes through the intestinal wall into the blood stream combines with iron binding cell tissues or proteins in the blood and is carried to sites where the iron again passes through a membrane into the cells of the tissue where the iron is utilized.

Where the invention chelate, e.g. the iron chelate is applied intramuscularly the iron also passes through membranous tissue of the muscle and into the blood where it combines with iron binding proteins therein as above noted.

The blood only carries a limited amount of iron binding protein, and hence only a limited amount of iron can be absorbed into the blood through the intestinal wall, or through the membranous tissue of the muscle where the metal chelates hereof are administered intramuscularly.

However, where it is necessary to introduce a much larger amount of iron into the blood than is normally the case, intravenous injection of the metallic chelates hereof can be resorted to. In this manner a large amount of iron-reducing sugar chelate hereof can be incorporated directly into the blood. Due particularly to the nontoxic nature of the chelates hereof, a portion of the iron of such chelates combines with the iron binding proteins present in the blood, and the remaining iron still in the form of the chelate hereof maintains the excess iron in soluble form during its transport by the blood to the sites where all of the iron, both that combined with proteins of the blood, and the excess iron still in the form of the chelates hereof can be absorbed through the cells. Due to the stability of the chelate at the pH of the environment and due to its solubility, the body can tolerate larger quantities of the metal in the form of the chelate of the invention, than in presently employed forms. In this respect, it is noted that the conventionally employed ferrous sulfate cannot be intravenously administered to provide excess iron, since the ferrous sulfate in excess of the binding capacity of the serum will be toxic.

In any event, regardless as to the manner of administering the chelates hereof only an amount of the metallic constituent is administered which is biologically tolerable or nontoxic.

The following are examples of preparation of chelates according to the invention:

*Example 1*

A 0.02 molar aqueous solution of ferric chloride is admixed with an equal volume of about a .32 molar aqueous solution of fructose at a temperature of 70° F., the resulting solution being about .01 molar in iron and .16 molar in fructose. The pH of the solution is adjusted from a pH of about 2 to 3 to a pH of about 8 by rapid addition of aqueous sodium hydroxide solution. The chelate formed remains soluble and stable at pH values between about 3 and 12, and passes rapidly through a dialysis membrane. An example of such a membrane is a "Visking" sausage casing, understood to be regenerated cellulose.

Dialysis membranes such as a Visking casing is an artificial semipermeable membrane. The ability of the metal-reducing sugar chelates employed in the invention process, to be absorbed through a biological membrane such as the mucosal cells of the intestine can be directly correlated with the molecular size of the chelate as determined by the chelate's ability to pass through a synthetic membrane. Hence, if the chelate will pass through a dialysis membrane such as a Visking sausage casing, it will also function as a vehicle for absorption of the metal constituent through a biological membrane. However, where the alkaline material employed in adjusting the pH of the chelate is added slowly to the aqueous solution of the chelate, although such chelate may not pass through a semipermeable membrane, it will nevertheless be absorbable by a biological membrane.

*Example 2*

A 0.1 molar solution of ferrous chloride is mixed with an equal volume of a 3 molar solution of glucose, and the pH of the solution is adjusted to pH of about 8 by rapid addition of sodium hydroxide. The chelate formed remains soluble and stable at all pH values up to 12, and passes rapidly through a dialysis membrane.

*Example 3*

A 0.02 molar solution of calcium chloride is mixed with an equal volume of about a .32 molar solution of fructose, the resulting solution being about .01 molar in calcium and .16 molar in fructose, and the pH of the solution is adjusted to 8 by addition of potassium hydroxide. The resulting chelate is soluble and stable over the pH range of 3 to 12, and passes rapidly through a dialysis membrane.

*Example 4*

A .02 molar solution of titanium chloride is mixed with an equal volume of a 0.4 molar solution of galactose and the resulting solution is adjusted to a pH of about 8 by addition of alkali. The resulting chelate is soluble and stable over the pH range of 3 to 12, and passes rapidly through a dialysis membrane.

*Example 5*

A 0.2 molar cobaltic nitrate solution is mixed with an equal volume of a 1.6 molar solution of fructose and the resulting solution is adjusted to pH of 8 by addition of alkali. The resulting solution of the chelate is soluble over a wide pH range, and passes rapidly through a dialysis membrane.

*Example 6*

A 0.2 molar solution of nickel nitrate is mixed with an equal volume of a 1.6 molar solution of glucose and the resulting solution adjusted to pH of about 8 by addition of alkali. The chelate so formed is soluble and stable over the pH range of 3 to 12, and passes rapidly through a dialysis membrane.

*Example 7*

The procedure of Example 6 is repeated employing in one instance a 0.2 molar solution of manganese chloride and in the other instance a 0.2 molar solution of vanadium sulfate, each in place of the 0.2 molar solution of nickel nitrate. In both cases the chelate formed is soluble and stable over the 3 to 12 pH range, and passes rapidly through a dialysis membrane.

*Example 8*

Ferric chloride and glucose are added to water to form a solution 1 molar in ferric chloride and 4 molar in glucose, and the resulting solution adjusted to pH of about 8 by rapid addition of sodium hydroxide. The chelate formed is soluble and stable over a pH range of 3 to 12, and passes rapidly through a dialysis membrane.

*Example 9*

The procedure of Example 1 is repeated, employing in separate instances a 0.4 molar solution of galactose and a 0.4 molar solution of mannose, in place of the .32 molar solution of fructose. In both instances the chelates formed are soluble and stable over the 3 to 12 pH range, and passes rapidly through a dialysis membrane.

*Example 10*

A 0.2 molar solution of chromic chloride is mixed with about an equal volume of a 1.6 molar solution of mannose, and the pH of the solution is adjusted to 8 by addition of ammonium hydroxide. The resulting chelate is soluble and stable over the pH range of 3 to 12 and passes rapidly through a dialysis membrane.

*Example 11*

The procedure of Example 1 is repeated employing in place of the .32 molar fructose solution a 0.4 molar solution of invert sugar (0.2 molar in fructose and 0.2 molar in glucose).

*Example 12*

A series of chelates are formed by adding the soluble metal compounds and reducing sugar, designated A and B, respectively, to water to form a solution having the respective molar concentrations of A and B shown in the table. In each case, the solution is adjusted to a pH of about 8 by rapid addition of sodium hydroxide solution. The chelate formed in each instance remains soluble and stable over a wide pH range of about 3 to 12.

| A | Molarity | B | Molarity |
|---|---|---|---|
| Calcium nitrate | 0.5 | Galactose | 2 |
| Magnesium chloride | 0.1 | Ribose | 1 |
| Strontium chloride | 0.1 | Lactose | 1 |
| Barium acetate | 0.1 | Lactose | 1 |
| Cupric nitrate | 0.01 | Maltose | 0.15 |
| Zinc sulfate | 0.01 | Maltose | 0.15 |
| Ferric chloride | 0.1 | Arabinose | 2.0 |
| Calcium chloride | 0.1 | Glucose | 1.0 |
| Chromium chloride | 0.01 | Fructose | 0.15 |
| Cupric nitrate | 0.1 | Fructose | 0.9 |
| Zinc sulfate | 0.1 | Glucose | 0.9 |

The following are examples to determine the efficacy of the chelates of the invention for oral administration, and illustrate the process of the invention.

*Example 13*

To the ferric chloride solution employed in preparation of the chelate of Example 1 is added a minute amount of a solution containing radioactive iron as $Fe^{59}$ in the form of ferric chloride in hydrochloric acid solution. The amount of radioactive iron so added to the 0.02 molar ferric chloride solution of Example 1 is but an insignificant fraction of the total iron content of the last mentioned ferric chloride solution. This addition of radioactive iron is made to enable the tracing of the transport of iron through biological membranes into the blood, and facilitates measurement of the rate of uptake of the chelated iron by the blood.

Rabbits were rendered anemic by repeated bleedings. This was done to insure a high level of unbound serum iron-binding capacity. The animals were anesthetized and a catheter inserted into the carotid artery of the neck. This plastic catheter was connected with a glass spiral of 1.8 ml. capacity, which was inserted directly into the scintillation well counter. The return flow of blood was placed directly into the jugular vein, thus completing a continuously flowing current of blood from the animal to the well counter and back into the animal. An incision was made in the abdomen of the rabbit, and the intestines with the circulation intact were brought outside the abdominal cavity. A 20 cm. section of intestine was tied off, and the interior washed several times with warm saline solution. A 4 ml. sample of the ferric fructose chelate solution formed in Example 1 and containing a minute amount of radioactive iron as described above was inserted directly into the tied-off portion of the intestine. The total amount of iron contained in the sample was 2 mg., and the specific activity of the radioactive iron was approximately 2 million counts per minute/4 ml.

The amount of radioactivity was monitored with a pulse-height analyzer linked to a count-rate meter and

Example 14

The same procedure as noted above in Example 13 is followed in three other experiments except that in each instance a 2 mg./4 cc. FeSO₄ solution, a ferric chloride-sorbitol solution, and a ferric chloride solution was employed in place of the iron-fructose chelate. To each of these solutions a minute amount of radioactive iron, Fe⁵⁹, was added as FeCl₃ in HCl solution to trace the iron to the blood. The amount of iron present in each of the aforementioned three solutions was 2 mg./4 ml., the same as the ferric concentration in the ferric-fructose solution. The FeSO₄ solution is a conventional type of formulation employed in supplying dietary iron to the blood.

Figure 2:
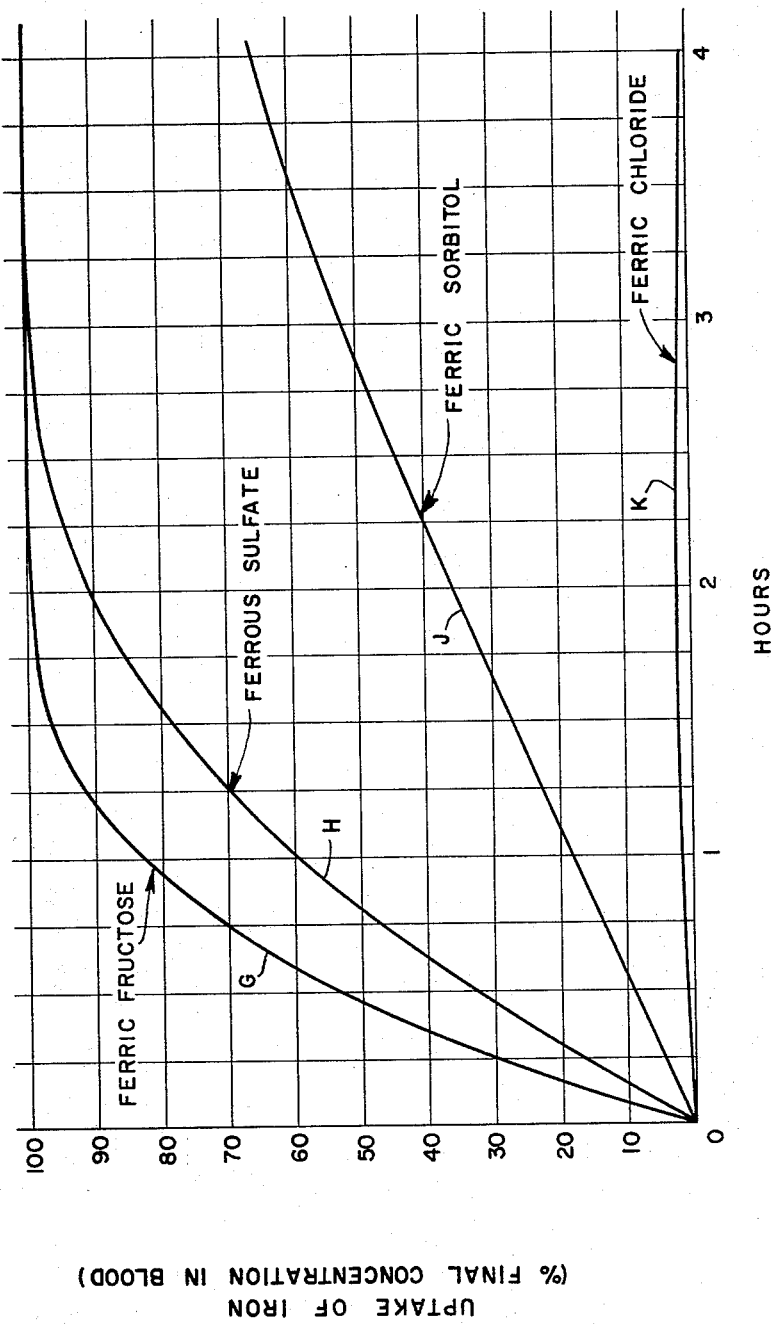

In FIG. 2 of the drawing is a graph in which uptake of iron as Fe⁵⁹ in the blood in terms of percent of maximum ferric iron concentration which could be carried in the blood, indicated as 100%, is plotted against time in hours. The curves obtained for each of the 4 experiments are marked G, H, J and K.

It will be noted in FIG. 2 that when the ferric fructose chelate is employed (curve G) a 98% uptake of iron is obtained in about 2 hours, whereas a 98% uptake is reached employing the FeSO₄ solution (curve H) in about 3 hours. A much longer period of time (substantially in excess of 4 hours) is required for uptake of 98% on for the ferric-sorbitol solution (curve J), and for ferric chloride solution, only a minor amount of the order of about 2% uptake is obtainable regardless of the time element.

Stated differently, in a period of 2 hours, employing the ferric fructose chelate of the invention (curve G) a 98% uptake of iron is realized, whereas at the end of 2 hours, only 90% uptake is obtained employing FeSO₄ solution (curve H), and for ferric sorbitol solution (curve J) only about a 36% uptake of iron is attained, and for ferric chloride solution (curve K) only a 2% uptake of iron is obtained.

The above results clearly show the superior effectiveness of the invention process for rapid introduction or absorption of iron through a biological membrane into the blood of mammals, employing the metal chelates described herein. The efficacy of the various chelates to function for this purpose can be determined by the procedure of Example 13 employing the chelate being tested in place of ferric fructose chelate of Example 13.

Example 15

The same procedure as noted above in Example 13 was followed employing in place of the ferric fructose chelate thereof the alkalized calcium fructose chelate of Example 3, the total amount of calcium introduced being 2 mg. In forming the calcium fructose chelate employed in this test, a minor amount of a solution containing radioactive strontium as Sr⁸⁵ in the form of a strontium chloride solution, was added to the calcium chloride solution, in order to trace the uptake of the calcium of the complex through biological membrane, that is, the intestine of the rabbit and into the blood.

Similarly 2 mg./4 cc. of calcium as calcium chloride solution was administered by the procedure of Example 13. Substantially similar results were obtained for uptake of calcium by the blood of the rabbit as noted in Example 14 for uptake of iron employing the chelate of Example 1. Thus, about a 98% uptake of calcium was obtained from the calcium fructose chelate in 2 hours, whereas 3 hours were required to obtain a 98% uptake of calcium employing the calcium chloride solution.

The following is an example of the effectiveness of the invention process for introduction of iron into the human blood by oral administration of the chelates of the invention.

Example 16

Twelve children, aged 6 months to 5 years, all suffering from iron-deficiency anemia, were placed on an 18 milligram dosage of iron per day of the ferric fructose chelate of the invention, for a period of 14 days. The chelate was taken orally in the form of an aqueous solution .02 molar in iron and .64 molar in fructose, divided into three equal doses each day. Another group of 12 children in the same age group as the first 12 and all suffering from iron-deficiency anemia, were given 120 milligrams of iron per day as ferrous sulfate, for 14 days. The ferrous sulfate was administered in the form of an elixir or as a solution of ferrous sulfate, divided into three equal doses in the course of each day. Ferrous sulfate is the treatment conventionally employed to alleviate iron-deficiency anemia.

Hematological experiments showed that the first group of children on ferric fructose had equal or better response, with respect to uptake of iron in the blood, as did the second group of children on ferrous sulfate. This shows that equivalent or even greater uptake of iron in the blood can be obtained using less than ⅙ of the amount of ferric fructose as compared to ferrous sulfate, or alternatively, that for a given amount of ferric fructose, this material is more than six times as effective as regards iron uptake by the blood, as compared to ferrous sulfate.

It was further observed that no gastric upset occurred in the first group of children who were given ferric fructose. As to the second group of children given ferrous sulfate, some gastric upset was observed.

From the foregoing, it is seen that we have developed an efficient process for introducing metals into the mammalian body, and particularly facilitating the rapid absorption or transport of metals such as iron and calcium through biological membranes, employing a certain class of metal-reducing sugar chelates, e.g. ferric fructose or calcium fruutose for this purpose.

While we have described particular embodiments of our invention for the purpose of illustration, it should be understood that various modifications and adaptations thereof may be made within the spirit of the invention as set forth in the appended claims.

We claim:

1. A method for introducing a metal into the mammalian body, which comprises the administration of a complex consisting essentially of a reducing sugar and iron, said complex being prepared by reacting in aqueous solution said sugar and iron ions, the molor ratio of said sugar to said iron ions in the solution being at least 2:1, said complex being soluble and stable in aqueous media.

2. A method as defined in claim 1, wherein the complex is a chelate wherein said sugar is fructone, said iron is ferric iron and wherein the molar concentrations of the fructose and iron in the solution fall to the right of the curve marked B in FIGURE 1 of the accompanying drawing.

3. A method as defined in claim 1, wherein the complex is a chelate wherein said sugar is fructose, said iron is ferric iron and wherein the molar concentrations of the fructose and iron in the solution fall to the right of the curve marked A in FIGURE 1 of the accompanying drawing.

4. A method for introducing iron into the body of a lower animal, which comprises the administration of a complex consisting essentially of a reducing sugar and iron, said complex being prepared by reacting in aqueous solution said sugar and iron, the molar ratio of said sugar to said iron in the solution being at least 2:1, said complex being soluble and stable in aqueous media.

5. A method for introducing a metal into the mammalian body, which comprises the administration of a complex consisting essentially of a reducing sugar and calcium, said complex being prepared by reaction in aqueous solution said sugar and a soluble acid salt of calcium, the molar ratio of said sugar to said calcium in the solution being at least 2:1, said complex being soluble and stable in aqueous media.

6. A method for introducing calcium into the body of a lower animal, which comprises the administration of a complex consisting essentially of a reducing sugar and calcium, said complex being prepared by reacting in aqueous solution said sugar and a soluble acid salt of calcium, the molar ratio of said sugar to said calcium in the solution being at least 2:1, said complex being soluble and stable in aqueous media.

References Cited by the Examiner

UNITED STATES PATENTS

| | | | |
|---|---|---|---|
| 1,649,269 | 11/1927 | Van Scoyoc et al. | 167—68 |
| 2,885,393 | 5/1959 | Herb | 167—68 X |
| 2,943,100 | 6/1960 | Holstein | 167—68 |

OTHER REFERENCES

Bessman et al., Ann. Int. Med., vol. 47, No. 5, November 1957, pp. 1036–41 (page 1040 relied on).

Martell et al., "Chemistry of Metal Chelate Compounds," published by Prentice-Hall, 1956, pages 541–542 relied on.

Chenoweth, Pharmacological Reviews, vol. 8, 1956, pages 57–87 (page 75 relied on).

LEWIS GOTTS, *Primary Examiner.*

MORRIS O. WOLK, IRVING MARCUS, WALTER A. MODANCE, *Examiners.*

JULIAN S. LEVITT, F. CACCIAPAGLIA, JR., R. HUFF, *Assistant Examiners.*